US007225972B2

(12) United States Patent
Kawamata

(10) Patent No.: US 7,225,972 B2
(45) Date of Patent: Jun. 5, 2007

(54) SETTING APPARATUS FOR REMOTE MONITORING AND CONTROL SYSTEM

(75) Inventor: Mototsugu Kawamata, Kadoma (JP)

(73) Assignee: Matsushita Electric Works, Ltd., Osaka (JP)

( * ) Notice: Subject to any disclaimer, the term of this patent is extended or adjusted under 35 U.S.C. 154(b) by 94 days.

(21) Appl. No.: 11/186,881

(22) Filed: Jul. 22, 2005

(65) Prior Publication Data

US 2006/0025084 A1 Feb. 2, 2006

(30) Foreign Application Priority Data

Jul. 27, 2004 (JP) ............................ 2004-219334

(51) Int. Cl.
*G06F 17/00* (2006.01)
*G06F 7/00* (2006.01)
*G06K 7/10* (2006.01)

(52) U.S. Cl. ................ 235/375; 235/376; 235/472.01; 340/825.72; 340/3.1

(58) Field of Classification Search ................ 235/375, 235/376, 472.01; 340/3.1, 825.69, 825.72
See application file for complete search history.

(56) References Cited

U.S. PATENT DOCUMENTS 6,914,888 B1 * 7/2005 Iselt .......................... 370/310
2001/0014832 A1 * 8/2001 Hatemata et al. ............. 700/16
2006/0012488 A1 * 1/2006 Hilbrink et al. ....... 340/825.69

FOREIGN PATENT DOCUMENTS

JP 07099715 A * 4/1995
JP 2000-150770 5/2000
JP 2000-298978 10/2000

OTHER PUBLICATIONS

English language Abstract of JP 2000-298978.
English language Abstract of JP 2000-150770.

* cited by examiner

*Primary Examiner*—Akm Ullah
*Assistant Examiner*—Adrian Hruszkewycz
(74) *Attorney, Agent, or Firm*—Greenblum & Bernstein, P.L.C.

(57) ABSTRACT

A setting apparatus for a remote monitoring and control system, which is capable of setting relational data and addresses simultaneously, and is not easily lost. Included is a fixed part that is fixed to an installation surface, and a portable part detachably attached to the fixed part. When the portable part is retained at the fixed part, the portable part can be electrically connected to a signal line, and sets relational data for a transmission controller. When the portable part is separated from the fixed part, the portable part can set addresses corresponding to a switch and a load, with respect to an operation terminal and a control terminal, according to a signal, such as an infrared light transmitted from a light emitting element installed at the portable part. When the addresses are not being set, since the portable part can be retained at the fixed part, the portable part will not be easily lost although a dedicated storage receptacle is not provided.

19 Claims, 11 Drawing Sheets

SETTING APPARATUS FOR REMOTE MONITORING AND CONTROL SYSTEM

BACKGROUND OF THE INVENTION

1. Field of the Invention

The present invention relates to a setting apparatus for remote monitoring and control system.

2. Description of the Related Art

Conventionally, in a remote monitoring and control system including an operation terminal having switches to which unique addresses are respectively set, a control terminal connected to loads to which unique addresses are respectively set, and a transmission controller which causes transmission signals to be communicated between the operation terminal and the control terminal, in a time division multiplex transmission mode, through a signal line to which the operation terminal and the control terminal are branch-connected, generates control data for controlling the loads based on monitoring data received from the operation terminal when the switches are operated, and transmits the control data to the control terminal to which the related loads are connected by relational data preset for the operated switches, an address setter for setting addresses for the operation terminal or the control terminal, or a pattern setter which is connected to the signal line, and generates, transmits and sets the relational data to the transmission controller so as for a plurality of loads to be controlled simultaneously by one switch are provided.

Here, since an address corresponding to a switch or a load cannot be set through the signal line, and needs to be set directly to the operation terminal or the control terminal, the address setter is generally provided in a portable type and wireless signals are used for communication between the address setter and the operation terminal and the control terminal. (For example, see patent document 1.)

Meanwhile, since relational data can be set directly to the transmission controller through the signal line, the pattern setter is configured to be fixed to an installation surface and to be connected to the signal line. (For example, see patent document 2.)

[Patent Document 1] Japanese Patent Laid-Open No. H11-150770

[Patent Document 2] Japanese Patent Laid-Open No. H11-298978

As described above, since the address setter and the pattern setter have different settings, conventionally, it is necessary that the address setter and the pattern setter should be separately set up.

Furthermore, in case that a holder or a private storage receptacle for retaining the address setter is not additionally installed, it often happens that the address setter is missing.

SUMMARY OF THE INVENTION

The present invention has been made in view of the above problems, and the feature of the present invention is to provide a setting apparatus for remote monitoring and control system, which is capable of simultaneously setting addresses and relational data, and will not be easily lost.

The invention of claim 1 is characterized in that a setting apparatus for remote monitoring and control system, which is used for a remote monitoring and control system including an operation terminal having switches to which unique addresses are respectively set, a control terminal connected to loads to which unique addresses are respectively set, and a transmission controller which causes transmission signals to be communicated between the operation terminal and the control terminal, in a time division multiplex transmission mode, through a signal line to which the operation terminal and the control terminal are branch-connected, generates control data for controlling the loads based on monitoring data received from the operation terminal when the switches are operated, and transmits the control data to the control terminal to which the related loads are connected by relational data preset for the operated switches, and which is connected to the signal line, and generates, transmits and sets the relational data to the transmission controller so as for a plurality of loads to be controlled simultaneously by one switch are provided, comprises a fixed part fixed to a installation surface and a portable part detachably attached to the fixed part and capable of being carried as separated from the fixed part, wherein the fixed part includes a base fixed to the installation surface and a connecting means for electrically connecting the portable part to the signal line, and wherein the portable part includes an operation means for allowing the addresses and the relational data to be input manually, a control means for generating the addresses and the relational data based on the input to the operation means, a wireless transmission means controlled by the control means for transmitting the addresses to the operation terminal and the control terminal as wireless signals, a connected means for being electrically connected to the signal line through the connecting means of the fixed part while the portable part is retained on the fixed part, a wire transmission means controlled by the control means for transmitting the relational data to the transmission controller through the connected means, the connecting means and the signal lines, a power supply means for supplying power to each part of the portable part, and a housing detachably mounted on the base of the fixed part by a retaining means installed on at least one of the fixed part and the portable part, for receiving the control means and the power supply means and for exposing the operation means to a position exposed while being mounted on the base of the fixed part.

In accordance with this invention, it is possible to set both an address corresponding to a switch of the operation terminal or to a load of the control terminal and the relational data of the transmission controller. Further, since the portable part can be retained on the fixed part in case that address setting is not performed, the portable part will not be easily lost.

The invention of claim 2 is characterized in that the connecting means and the connected means are composed of connectors which are mechanically and electrically connected to each other, and a connector of the fixed part is mechanically connected to the base of the fixed part through a flexible electric wire and is electrically connected to the signal line, in the setting apparatus for remote monitoring and control system according to claim 1.

In accordance with this invention, since connectors can be attached to and detached from each other in case that the portable part is separated from the fixed part, the connectors are not damaged when the portable part is attached to and separated from the fixed part.

The invention of claim 3 is characterized in that the retaining means is composed of a magnet mounted on either side of the fixed part and the portable part and an adsorption plate which is made of magnetic material and adsorbed to the magnet while being mounted on the other side of the fixed part and the portable part, and each of the connecting means and the connected means is made of conductive material and is composed of contactors that contact and conduct with each other when the adsorption plate is magnetically attached to the magnet, in the setting apparatus for remote monitoring and control system according to claim 1.

In accordance with this invention, the portable part can be retained on the fixed part only by attaching the adsorption plate to the magnet, and the portable part can be separated from the fixed part only by detaching the portable part from the fixed part with resistance to the magnetic force of the magnet. Accordingly, since it is not necessary to shake the portable part from the fixed part in both case of installation and separation, the portable part can be attached to and detached from the fixed part without damaging the contactors.

The invention of claim 4 is characterized in that the connecting means is composed of contactors, which are made of conductive material, capable of contacting and conducting with each other when the portable part is retained on the fixed part, and a contacting surface between the contactors is a surface intersecting a direction in which the portable part is attached to the fixed part, in the setting apparatus for remote monitoring and control system according to claim 1.

In accordance with this invention, since a contacting surface between the contactors is a surface intersecting a direction in which the portable part is attached to the fixed part, and thereby the contacting surfaces should be just lightly touched each other even though the portable part is shaken from the fixed part, the portable part can be attached to and detached from the fixed part without damaging the contactors.

The invention of claim 5 is characterized in that the base of the fixed part includes a recess part in which at least part of the housing of the portable part can be housed, and the connecting means is received in the recess part and includes a blank cover detachably attached to the base of the fixed part for covering the recess part, in the setting apparatus for remote monitoring and control system as claimed in any of claims 1 to 4.

In accordance with this invention, the blank cover can protect the connecting means of the fixed part when the portable part is separated from the fixed part, and can improve appearance.

The invention of claim 6 is characterized by further comprising a protective cover detachably attached to the housing of the portable part for covering the operation means, in the setting apparatus for remote monitoring and control system as claimed in any of claims 1 to 5.

In accordance with this invention, the protective cover installed on the portable part can prevent unintended operation of the operation means while the setting apparatus for remote monitoring and control system is not used. Further, the protective cover can improve appearance when the portable part is retained on the fixed part.

The invention of claim 7 is characterized in that the power supply means includes a secondary battery, and the portable part receives power through the connecting means under being retained on the fixed part and includes a charging means for charging the secondary battery, in the setting apparatus for remote monitoring and control system as claimed in any of claims 1 to 6.

In accordance with this invention, since a secondary battery becomes main power when the portable part is separated from the fixed part and is charged when the portable part is retained on the fixed part, it is possible to prevent power from being lost while the portable part is separated from the fixed part.

DESCRIPTION OF THE PREFERRED EMBODIMENT

Certain preferred embodiments of the present invention will now be described with reference to the drawings.

Figure 1:
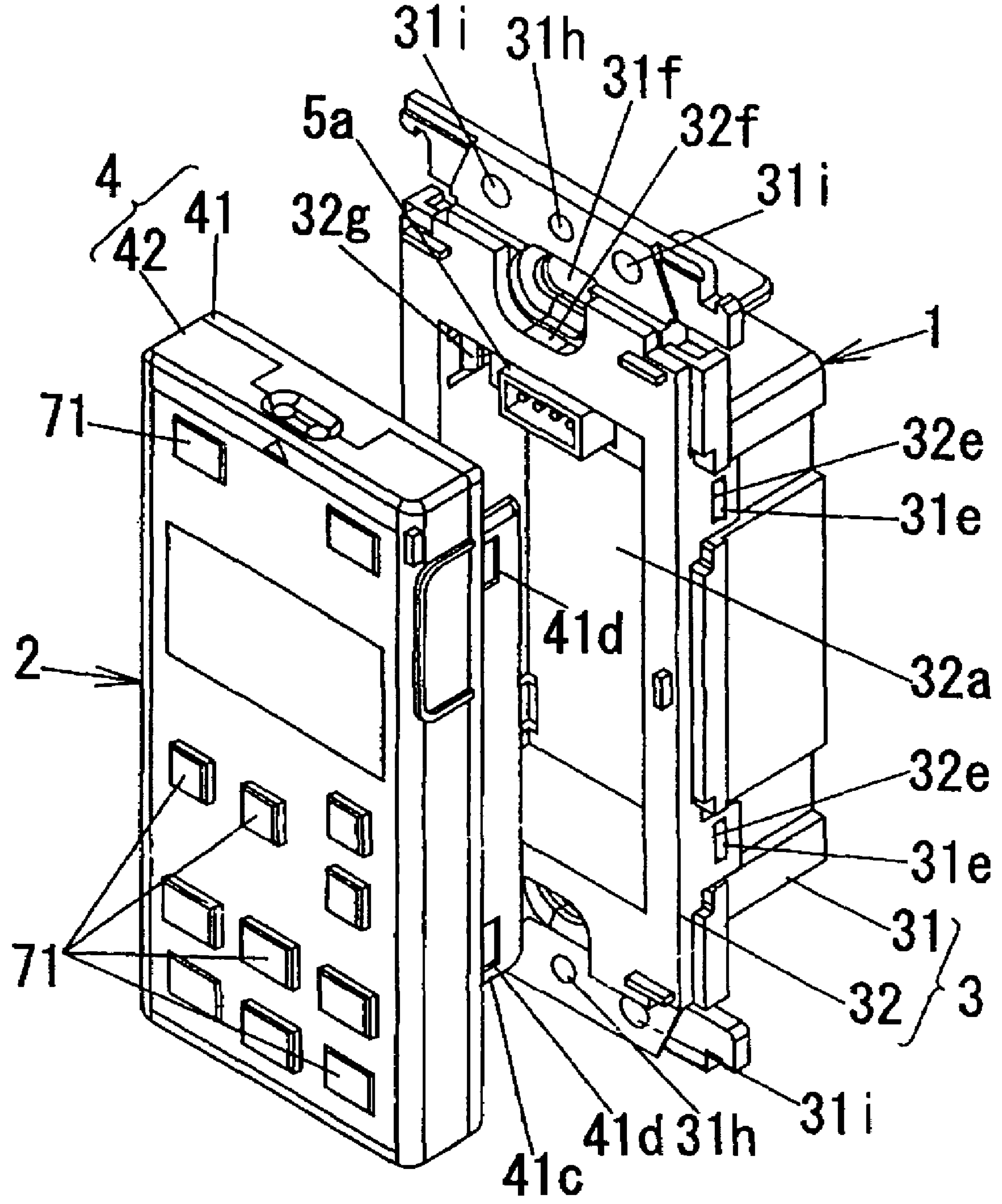
FIG. 1 is a perspective view of a setting apparatus for remote monitoring and control system in accordance with one embodiment of the present invention.

As shown in FIG. 1, a setting apparatus for remote monitoring and control system according to the present invention includes a fixed part 1 which is fixed on installation surface (not shown) and a portable part 2, which is detachably attached on the fixed part 1. When the portable part 2 is retained on the fixed part 1, the portable part 2 is electrically connected to a signal line. Hereinafter, the up-and-down direction is based on FIG. 1. Further, a lower left-upper right direction in FIG. 1 is referred to as "forward-and-back direction" and an upper left-lower right direction is referred to as "left-right direction".

Figure 2:
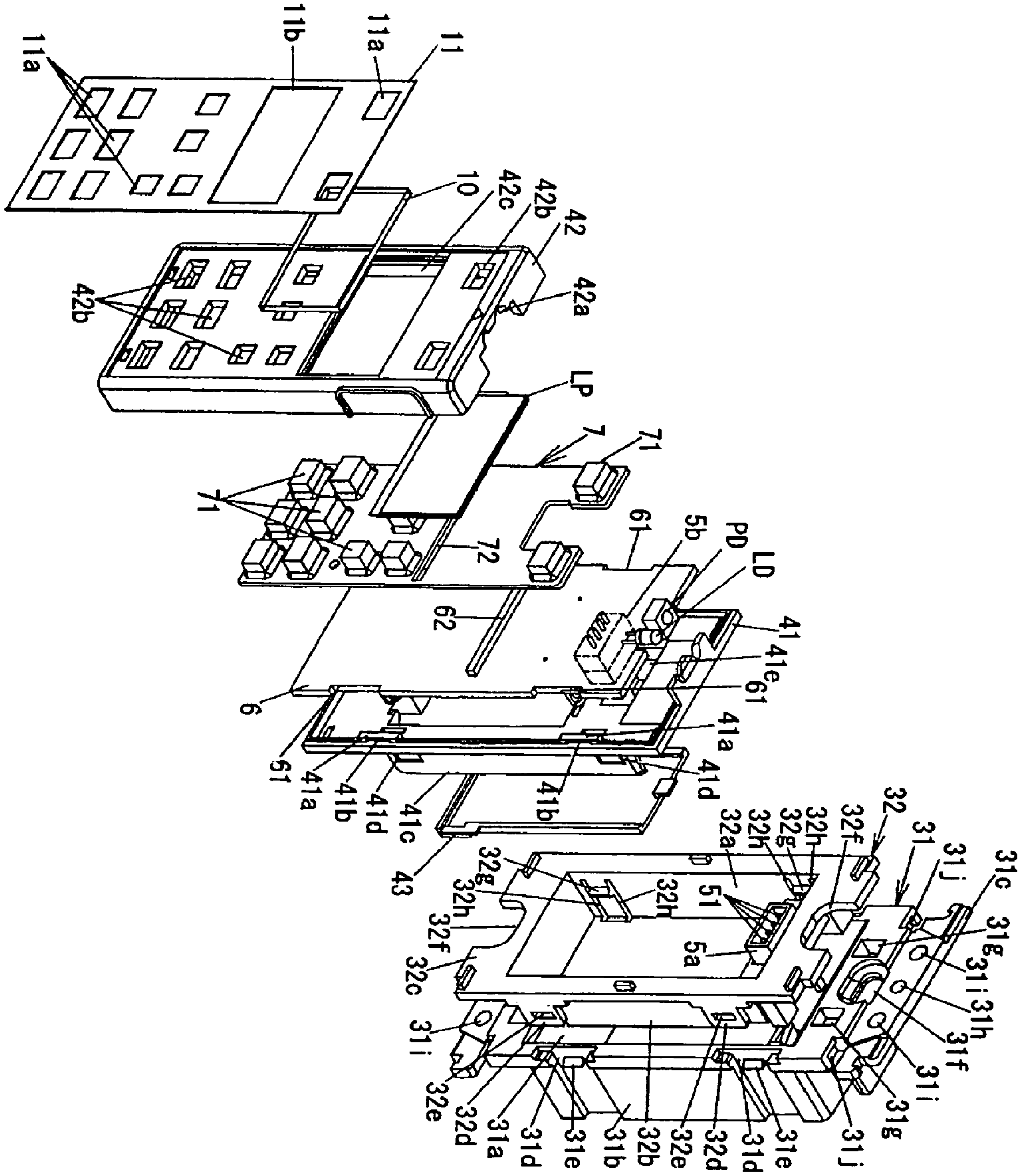
FIG. 2 is an exploded perspective view of the above.

As shown in FIG. 2, the fixed part 1 includes a base 3 which is composed of a body 31 embedded and fixed in an embedding hole (not shown) formed on the installation surface and a cover 32 attached to a front side of the body 31. The body 31 and the cover 32 include, respectively, rectangular parallelepiped body portions 31*b*, 32*b* having recess parts 31*a*, 32*a* on front sides thereof, and flange portions 31*c*, 32*c* projected outward along opening surfaces of the recess parts 31*a*, 32*a* from front ends of the body portions 31*b*, 32*b*. At each of the left and right sides of the body portion 31*b* of the body 31, two grooves 31*d* are formed up and down in line to be opened in front and rear, and, at front ends of lower surfaces of the groove portions 31*d*, engaging protrusions 31*e* are formed to be projected outwards. Meanwhile, at each of the left and right sides of the flange portion 32*c* of the cover 32, two engaging members 32*d* are formed up and down in line to be projected, and, at each of the engaging members 32*d*, an engaging hole 32*e* is formed to penetrate through the engaging member 32*d* in left and right. Accordingly, as the engaging protrusion 31*e* of the body 31 is inserted into the engaging hole 32*e* of the engaging member 32*d* of the cover 32, the cover 32 is engaged with the body 31, wherein the engaging member 32*d* of the cover 32 is introduced into the groove portion 31*d* on the front of the body 31.

Figure 4:
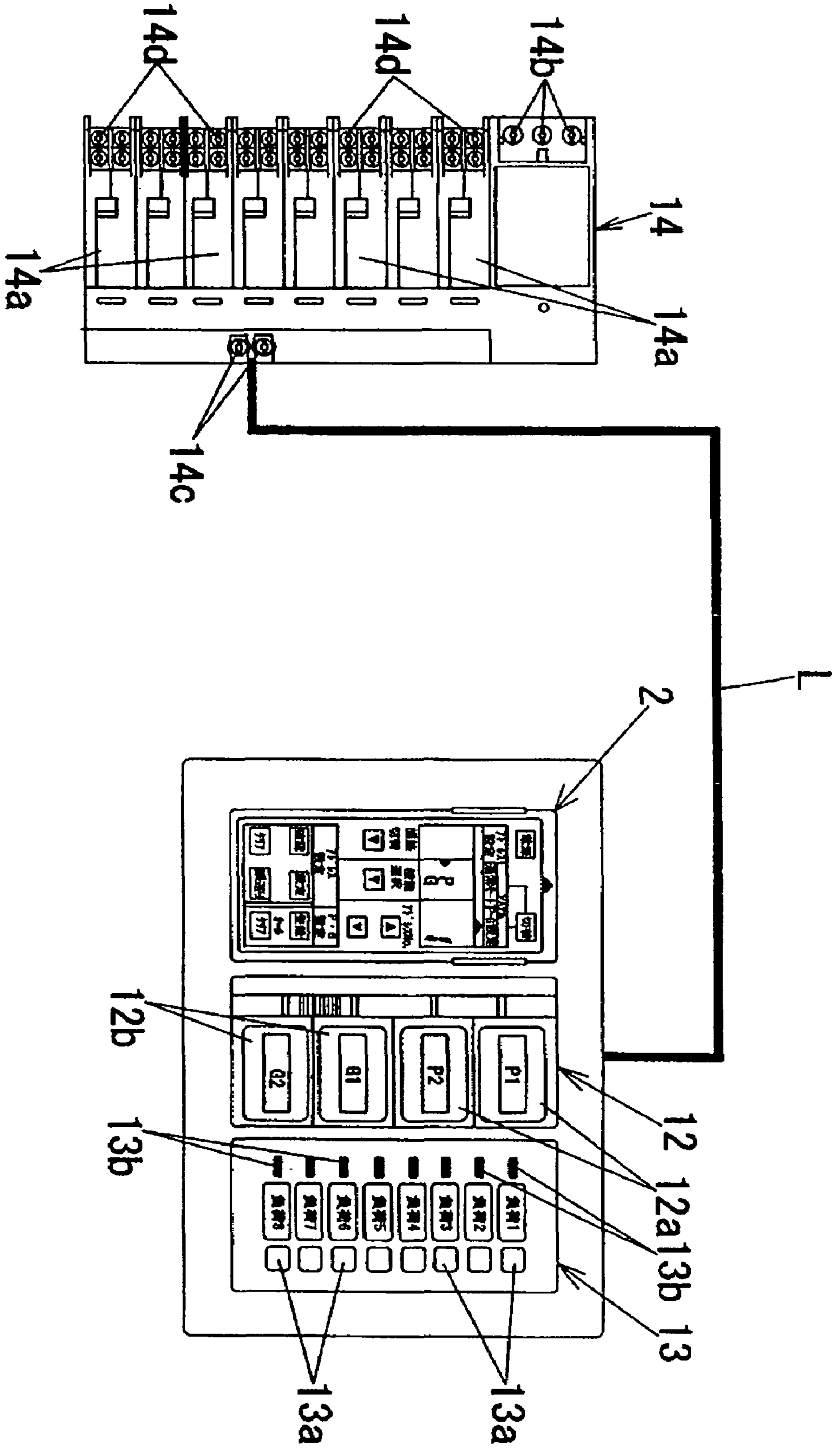
FIG. 4 is an explanation view to explain the use of the above.

Further, the body 31 of the fixed part 1 has a shape corresponding to an existing installation frame of connectable square type under JIS C 8304. Box holes 31*f* are at upper and lower ends of the flange portion 31*c* of the body 31. Each of the box holes has a shape of a horizontal long-hole, and allows a box screw to be penetrated therein and engaged with an insertion box (not shown) which is inserted into the installation surface. Hook holes 31*g* are pierced in left and right sides of the box hole 31*f*. In case that the installation surface is made of a panel, the hook hole 31*g* is used to hook an insertion member (not shown) which is inserted between the panel and the flange portion 31*c* and supports the panel. Plate holes 31*h* are pierced away farther from a recess part than the box hole 31*f* at upper and lower ends of the flange portion 31*c*. Through the plate hole 31*h*, a screw for installing a plate penetrates. Direct installation holes 31*i* are formed on the left and right sides of each of the plate holes 31*h* so as for the direct installation screws engaged with the installation surface to penetrate through. The box hole 31*f* is pierced in each of upper and lower ends of the flange portion 32*c* of the cover 32. A notch portion 32*f* is formed at each of upper and lower ends of the flange portion 32*c* of the cover 32 in order to expose the box hole 31*f* in a front direction. Furthermore, a connector 5*a* is installed at an upper end in the recess part 32*a* of the cover 32. The connector 5*a* includes a contactor 51 which is electrically connected to a signal line L. (FIG. 4)

The portable part 2 includes a housing 4 which is composed of a cover 42 and a body 41. The cover 42 has a rectangular parallelepiped shape with an open rear side and the body 41 closes the rear side of the cover 42. Engaging protrusions 41*a* are formed at both left and right ends of the body 41 to be protruded forward, and an engaging hole 41*b* is formed at each outer side of the engaging protrusions 41*a*. Engaging protrusions (not shown) are formed at left and right inner surfaces of the cover 42 to be protruded inward. The body 41 and the cover 42 are engaged with each other as the engaging protrusions are inserted into the engaging holes 41*b*. Retaining members 41*c* are formed at left and right ends of the body 41 to be protruded backward, while facing each other in the left-right direction, and retaining holes 41*d* are formed to be pierced in the left-right direction at upper and lower ends of each retaining member 41*c*. In the base 3 of the fixed part 1, retaining protrusions 32*g* are formed at left and right inner surfaces of the recess part 32*a* of the cover 32 to be protruded inward of the recess part 32*a*. Slits 32*h*, which are long in length in the front-rear direction, are installed at upper and lower sides of each retaining protrusion 32*g*. Parts inserted into the slits 32*h* are elastically deformed in the left-right direction, thereby causing the retaining protrusion 32*g* to elastically change an inner protrusion length from the recess part 32*a*. Further, the retaining protrusion 32*g* of the fixed part 1 is inserted into the retaining hole 41*d* of the portable part 2, thereby causing the portable part 2 to be retained on the fixed part 1. Namely, the retaining hole 41*d* and the retaining protrusion 32*g* constitute a retaining means. In addition, the body 41 has an open rear side including a battery-receiving portion (not shown) where a battery BT (see FIG. 3) is received. The portable part 2 is detachably attached to the body 41 and has a battery cover 43 for covering the battery-receiving portion.

In the housing 4 of the portable part 2, a printed wiring board 6 is received in such a way that its thickness direction faces the front-rear direction. A connector 5*b* is mounted on a rear surface of the printed wiring board 6. A connector insertion through-hole 41*e* is formed at the body 41 and protrudes the connector 5*b* backward. Therefore, in case that the portable part 2 is retained at the fixed part 1, the connectors 5*a* and 5*b* are connected to each other, and a contactor 52 (see FIG. 3) of the connector 5*b* of the portable part 2 contacts and conducts with the contactor 51 of the connector 5*a* of the fixed part 1. Namely, the connectors 5*a* and 5*b* constitute a connecting means. In addition, two recess parts are formed at both left and right ends of the printed wiring board 6. Accordingly, the engaging protrusion 41*a* is inserted into the recess part 61 so as to allow the printed wiring board 6 to be located with respect to the body 41.

Figure 3:
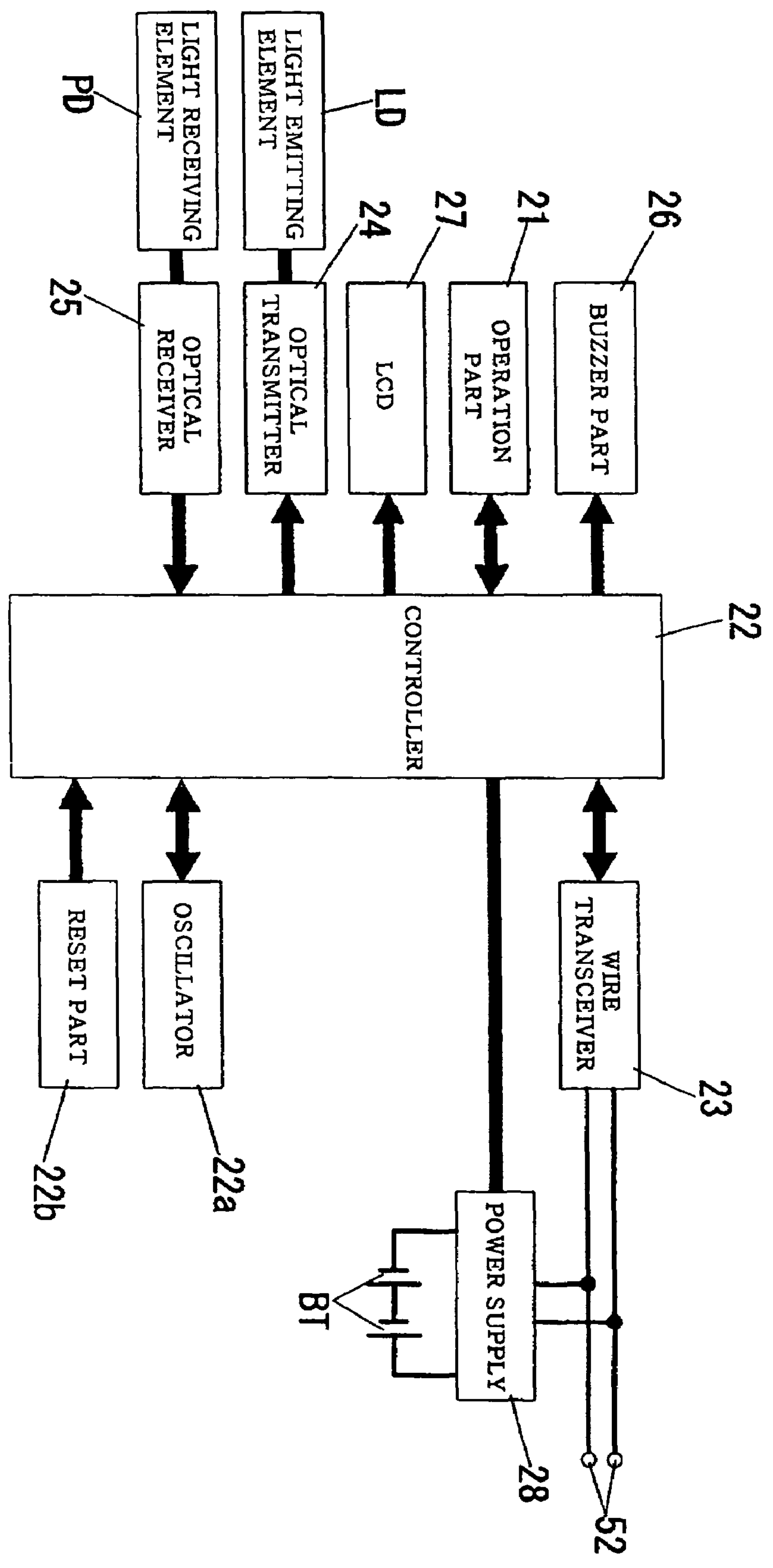
FIG. 3 is a block diagram of a portable part of the above.

As shown in FIG. 3, an operation part 21, a controller 22, an oscillator 22*a*, a reset part 22*b*, a wire transceiver 23, a light emitting element LD, an optical transmitter 24, a light receiving element PD, an optical receiver 25, a buzzer part 26, a liquid crystal display device 27, and a power supply 28 are mounted in the printed wiring board 6. Addresses and relational data are manually inputted to the operation part 21. The controller 22 is constituted by for example microcomputer and generates the address and the relational data based on the input to the operation part 21. The oscillator 22*a* sends a clock signal to the controller 22. The reset part 22*b* resets the controller 22. The wire transceiver 23 is a wire transmission means, which is controlled by the controller 22 and transmits the relational data to a transmission controller (not shown) through the connectors 5*a* and 5*b* and the signal line L. (see FIG. 4) The light-emitting element LD includes a light emitting diode for emitting infrared light as a wireless signal. The optical transmitter 24 is controlled by the controller 22, drives the light emitting element LD, and transmits addresses to an operation terminal (not shown) and a control terminal (not shown) as the infrared light. The optical transmitter 24 constitutes a wireless transmission means together with the light-emitting element LD. The light-receiving element PD includes a photo diode for receiving a signal transmitted from the operation terminal or the control terminal as the infrared light. The optical receiver 25 converts an output of the light-receiving element PD and inputs the converted result to the controller 22. The buzzer part 26 has a buzzer (not shown) and rings the buzzer according to an operation performed on the operation part 21. The liquid crystal display device 27 has a liquid crystal panel and performs various display operations under control of the controller 22. The power supply 28 supplies power to all elements of the portable part 2.

In addition, the portable part 2 includes a battery BT. Accordingly, the portable part 2 receives power from the power supply 28 while being retained at the fixed part 1, but the portable part 2 receives power from the battery BT while being separated from the fixed part 1. Namely, the power supply 28 and the battery BT constitute a power supply means.

The operation part 21 includes a rubber switch 7 and an input processor (not shown). The rubber switch 7 is composed of a plurality of push buttons 71 collectively formed on one surface of a flat plate. The input processor generates operation signals based on opening/closing of contact points formed in the push buttons 71 and inputs the signals to the controller 22.

A connecting hole 72, having a left-right long shape, is pierced in the center of the up-down direction of the rubber switch 7. Since a left-right long connecting protrusion 62 is protruded at the front of the printed wiring board 6, a location of the rubber switch 7 is determined with respect to the printed wiring board 6 as the connecting protrusion 62 is inserted into the connecting hole 72. In addition, terminals (not shown) are installed at an inner circumference of the connecting hole 27 and an outer circumference of the connecting protrusion 62. Accordingly, the terminals contact and conduct with each other in case that the connecting protrusion 62 is inserted into the connecting hole 72, thereby causing the printed wiring board 6 to be electrically connected to the rubber switch 7.

The light emitting element LD and the light receiving element PD are mounted on a upper end of the printed wiring board 6 in such a way that a light emitting section and a light receiving surface faces upwards, respectively. A notch portion 42*a* is formed at an upper end of the cover 42 of the housing 4, and makes an opening between the notch portion 42*a* and the body 41. The opening is opened backward and exposes the light emitting section of the light emitting element LD and the light-receiving surface of the light-receiving element PD.

Furthermore, a plurality of push button insertion through holes 42*b* and a window hole 42*c* are pierced in the cover 42 of the housing 4 in the front-rear direction. Push buttons 71 penetrate through the push button insertion through holes 42*b*. The window hole 42*c* exposes the liquid crystal panel LP. A window member 10 made of transparent material covers the window hole 42*c*. An inner circumferential surface of the window hole 42*c*A includes a stepped portion, which is formed to make a rear opening smaller than the front opening. The stepped portion prevents the window member 10 from being fallen toward the rear. Meanwhile, a nameplate 11 is installed at a front surface of the cover 42. A plurality of push button insertion through holes 11*a* and a window hole 11*b* are pierced in the nameplate 11 in the front-rear direction. Push buttons 71 penetrate through the push button insertion through holes 11*a*. The window hole 11*b* exposes the liquid crystal panel LP. The window hole 11*b* of the nameplate 11 is smaller than the window member 10. The nameplate 11 prevents the window member 10 from being fallen toward the front. In addition, indications of each function of push buttons 71 are attached to the nameplate 11.

As shown in FIG. 4, the portable part 2 in the embodiment, where a PG operation terminal 12 and an individual operation terminal 13 are arranged as an operation terminal, is connected to a transmission unit 14 through a signal line L.

The PG operation terminal 12 includes two pattern switches 12*a* and two group switches 12*b*. The two pattern switches 12*a* are used in a pattern control for simultaneously switching a plurality of loads already corresponded to relational data into control states set for each load. The group switches 12*b* are used in a group control for simultaneously turning on/off a plurality of loads already corresponded to relational data. The individual operation terminal 13 controls loads individually, and includes eight individual switches 13*a*, light emitting elements for displaying (not shown), and a display window 13*b*. The eight individual switches 13*a* correspond to each load. The light emitting elements for displaying correspond to loads in one-to-one and display a state of a load according a lighting state. The display window 13*b* draws lights of the light emitting elements for displaying. When the pattern switches 12*a*, the group switches 12*b*, or the individual switches 13*a* are operated, the PG operation terminal 12 and the individual operation terminal 13 generate monitoring data according to the pattern switches 12*a*, the group switches 12*b*, or the individual switches 13*a*, and transmit the generated monitoring data to the transmission unit 14 through the signal line L.

Eight relays 14*a* are installed at the transmission unit 14 and turns on/off a supply of power to loads. The transmission unit 14 is supplied with power, for example, through a single-phase three-wire connected to the power supply terminal 14*b*, and turns off loads connected to terminals 14*d* of the relays 14*a* by controlling the relays 14*a* according to monitoring data transmitted through the signal line L connected to the signal terminal 14*c*.

Hereinafter, a sequence for setting addresses and a sequence for setting relational data according to an embodiment of the present invention will be described. In the description of the sequences, push buttons 71 have terms and reference numerals different from each other.

Figure 5:
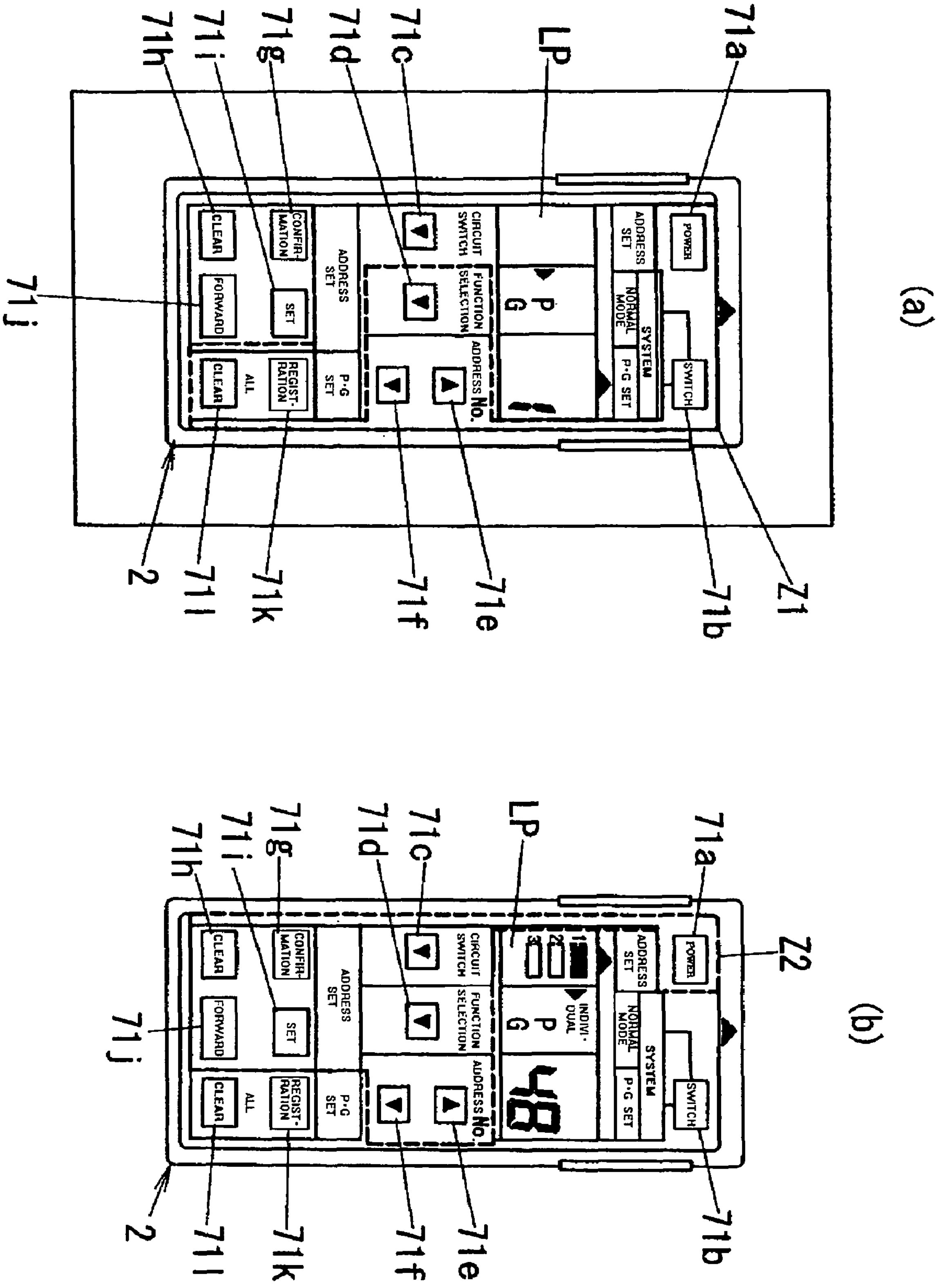
FIG. 5 is a front view of the portable part of the above, wherein (a) illustrates a construction in which the portable part is maintained to a fixed part, and (b) illustrates a construction in which the portable is separated from the fixed part.

First, the sequence for setting addresses will be explained. The setting of address is performed while the portable part 2 is separated from the fixed part 1, and the light emitting section of the light-emitting element PD is arranged to face the light receiving section (not shown) of the operation terminal or the control terminal, the addresses are set. Push buttons 71*a*, 71*c* through 71*j* at a box Z2 of FIG. 5B are used to set the addresses. Firstly, when the power button 71*a* is pushed, the controller 22 detects that the wire transceiver 23 is not connected to the signal line L, and starts to operate in a mode of setting the addresses. Next, a confirmation button 71*g* is pressed, the controller 22 controls the optical transmitter 24, and transmits a predetermined confirmation signal to the operation terminal or the control terminal as light of the light emitting element LD. When the operation terminal or the control terminal receives the confirmation signal, it transmits an address notification signal indicating set states of the addresses to the controller 22.

When the controller 22 receives the address notification signal through the light-emitting element PD and the optical receiver 25, the controller 22 controls the buzzer part 26 to generate a sound notifying the success of communication, for example a long sound. Further the controller 22 controls the liquid crystal display device 27 to display contents of the address notification signal on a liquid crystal panel LP. Then, a circuit switch button 71*c* is pressed, and a switch for setting the address or a circuit number is selected. The circuit number is a number that corresponds to the loads in one-to-one. Also, by pushing a function selection button 71*d*, a pattern or group address as well as individual address can be set. Thereafter, an address number is selected by address selection buttons 71*e* and 71*f*. Here, when a forward button 71*j* is pushed, a next address can be assigned to a next circuit number. Furthermore, when a clear button 71*h* is pushed, contents of an address set of a selected circuit number are reset.

After a selection of an address, when a set button 71*i* is pressed, the controller 22 controls the optical transmitter 24 to transmit a set signal to the operation terminal or the control terminal as light of the light emitting element LD. At this time, the set signal indicates a corresponding relation of a set circuit number and a set address. When the operation terminal or the control terminal receives the set signal, it sets the corresponding relation of the circuit number and the address, and transmits a predetermined response signal as light to the controller 22. When the response signal is received through the light receiving element PD and the optical receiver 25, the controller 22 controls the buzzer part 26 to generate a sound notifying the success of communication, for example a long sound. Consequently, the address set is completed.

After the confirmation signal or the set signal has been transmitted, when an address notification signal or a response signal is not received, the controller 22 controls the buzzer part 26 to generate a sound notifying the failure of communication, for example a short sound of five times. Further the controller 22 controls the liquid crystal display device 27 to display a message indicating the failure of communication on a liquid crystal panel LP.

The sequence for setting relational data will be now illustrated. Push buttons 71*a*, 71*b*, and 71*d* through 71*f*, 71*k* and 71*l* at a box Z1 of FIG. 5A are used to set the relational data. The setting of relational data is performed while the portable part 2 is retained at the fixed part 1. When the power button 71*a* is pushed, the controller 22 detects that the wire transceiver 23 is connected to the signal line L, and starts to operate in a mode of setting the relational data. Next, a switch button 71*g* is pressed, the controller 22 controls the optical transmitter 24, and transmits a predetermined set start signal to the transmission controller as light of the light emitting element LD. When the transmission unit 14 receives the set start signal, it changes a current mode from a normal mode controlling the relays 14*a* based on signals from the PG operation terminal 12 and the individual operation terminal 13 to a set mode setting the relational data.

In addition, to set relational data of a pattern control or a group control is selected by a function section button 71*d*. When a kind of relational data to be set is selected, an address of a switch corresponding to the related to be set, is selected by address selection buttons 71*e* and 71*f*. Here, when the pattern switch 12 or a group switch 12 of the PG operation terminal 12 operates, it is selected in the transmission unit 14 whether relational data corresponding to any pattern 12*a* or group switch 12*b* are set. The pattern switch 12*a* or the group switch 12*b* selected by the transmission unit 14 may be known to the controller 22 through the signal line L and the wire transceiver 23.

When a selection of addresses by switches is completed, a next corresponding load is set by operation of the individual switch 13*a* of the individual operation terminal 13. For example, when the pattern control is set, every time the individual switch 13*a* is presses, a state of the pattern switch is switched in an order of on by the pattern switch→ off by the pattern switch→ except control targets of the pattern switch→ on by the pattern switch. When the group is set, every time the individual switch 13*a* is presses, a state of the group switch is switched in an order of control targets of the group switch→ except the control targets of the group switch→ control targets of the group switch. A set state can be confirmed by a lighting state of a lamp in the display window 13*b*.

In addition, a push button 71 for setting addresses of loads being control targets or a pattern control operation may be provided at the portable part 2. In this case, the controller 22 generates relational data according to an operation applied to the push button 71. When the set operation is terminated, a registration button 71*k* is pressed. Accordingly, the controller 22 controls the wire transceiver 23 to transmit the relational data to the transmission unit 14 through the signal line L. When the transmission unit 14 receives the relational data, the set is changed according to the received relational data.

Where the transmission unit 14 is in a set mode, when a clear button 711 is pressed, the controller 22 controls the wire transceiver 23 to transmit a predetermined reset signal to the transmission unit 14 through the signal line L. When the transmission unit 14 receives the reset signal, it resets the set relational data.

In conclusion, when the switch button 71*b* is again pushed, the controller 22 controls the wire transceiver 23 to transmit a set termination signal to the transmission unit 14 through the signal line L. When the transmission unit 14 receives the set termination signal, the setting apparatus is changed from a set mode to a normal mode. The controller 22 again starts to control the relays 14*a* based on monitoring data transmitted from the PG operation terminal 12 and the individual operation terminal 13.

In accordance with the above-mentioned construction, it is possible to set both an address corresponding to a switch of the operation terminal or to a load of the control terminal and the relational data of the transmission controller. Further, since the portable part can be retained on the fixed part in case that address setting is not performed, the portable part will not be easily lost.

Figure 6:
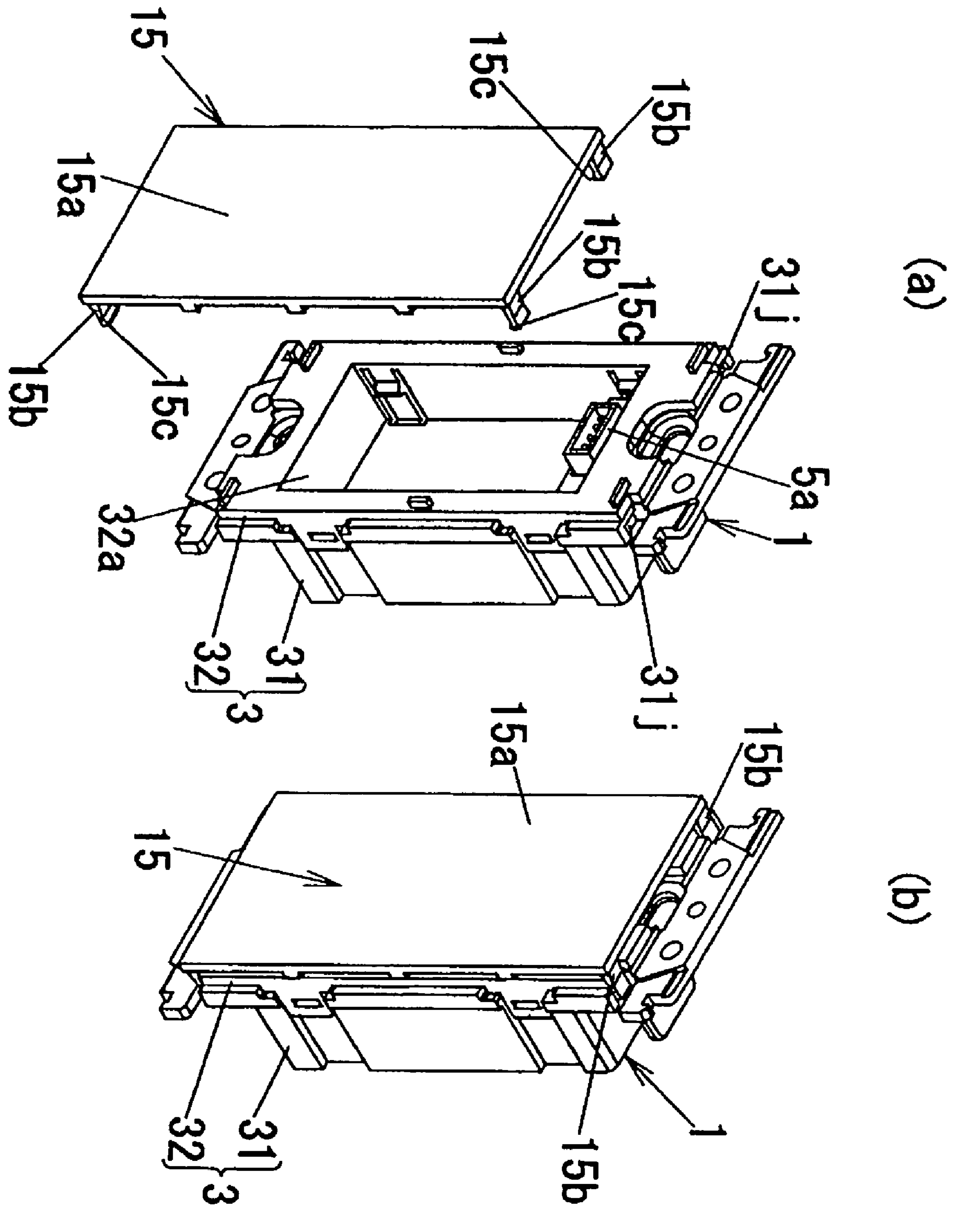
FIG. 6 is a perspective view of another example of the above, wherein (a) illustrates a construction in which a blank cover is separated from the fixed part and (b) illustrates a construction in which the blank cover is attached to the fixed part.

Moreover, as shown in FIG. 6A and FIG. 6B, it is preferable that a blank cover 15 detachably attached to the fixed part 1 for covering the recess part 32*a* may be installed. In the detailed description, the blank cover 15 includes a base portion 15*a* and engaging members 15*b*. The base portion 15*a* has a flat rectangular shape. The engaging members 15*b* are arranged at upper and lower ends of the base portion 15 left and right to be protruded in a rear direction. In each rear end of the engaging members 15*b*, an engagement claw 15*c* is formed to protrude at an inner side in up and down direction. An engagement recess part 31*j* is formed at each of upper and lower ends of the flange portion 31*c* of a body 31 of the base 3. The engagement claw 15*c* is engaged with the engagement recess part 31*j*. This causes the blank cover 15 to cover a front side of the base 3, thus closing the recess part 32*a*. When the construction is used, a profile of the fixed part 1 is improved from which the portable part 2 is separated, and the connector 51 can be protected.

Figure 7:
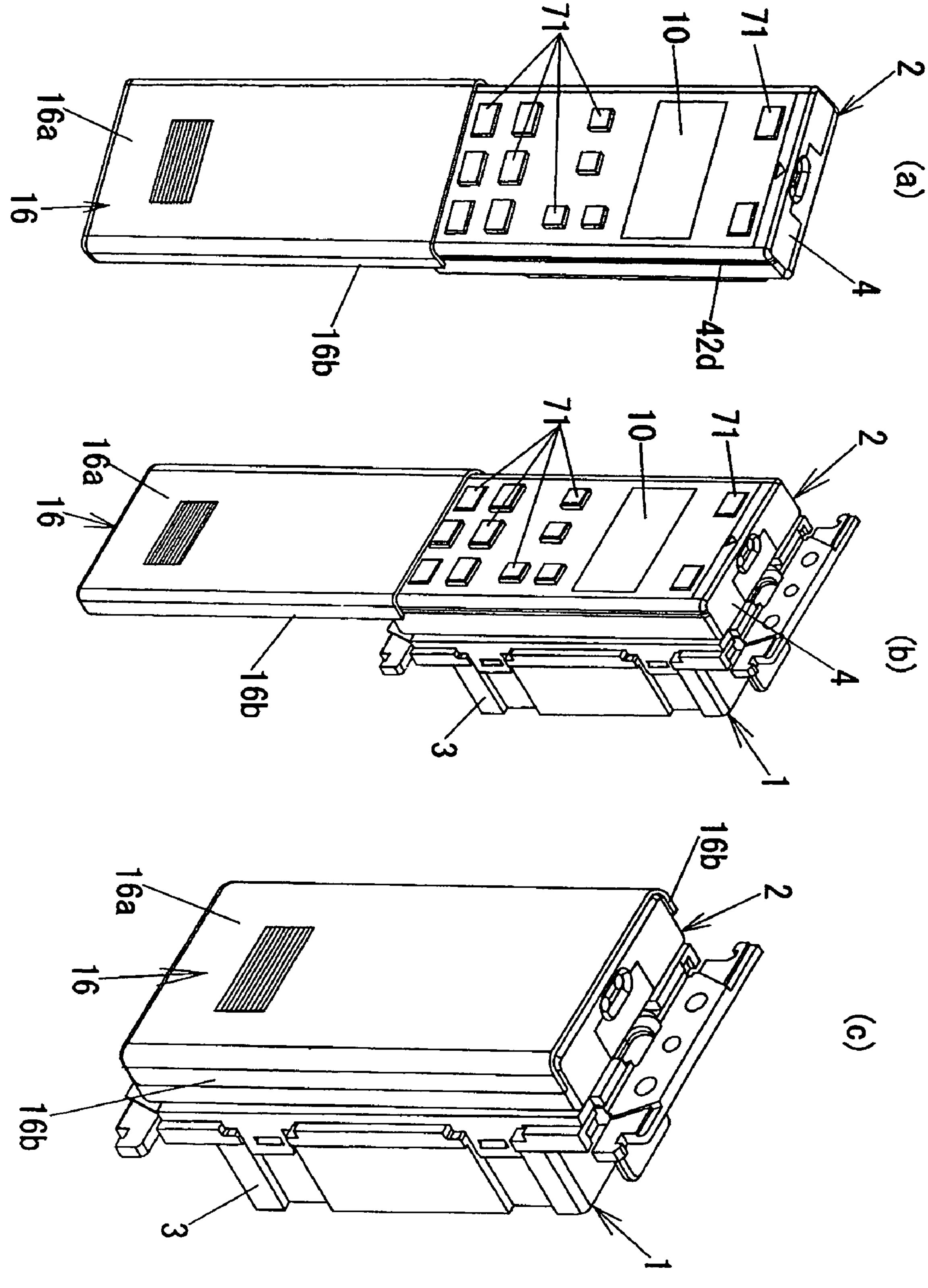
FIG. 7 is a perspective view of further another example of the above, wherein (a) illustrates a construction in which a portable part is separated from a fixed part, (b) illustrates a construction in which a portable part is maintained to the fixed part, and (c) illustrates a construction in which a push button is covered by a protection cover.

In addition, as shown in FIG. 7A to FIG. 7C, a protective cover 16 may be detachably engaged with the portable part 2 for covering the push button 71 and the window member 10 may be provided. In the details thereof, the protective cover 16 includes a front wall 16 and a sidewall 16*b*. The front wall 16*a* has a flat rectangular shape. The sidewall 16*b* is formed to protrude from both left and right ends of the front wall 16*a* to a rear direction. Accordingly, the protective cover 16 has ⊃ shape. An engaging protrusion (not shown) is formed at an inner surface of the sidewall 16*b* to be protruded. Further, engagement grooves 42*d* are formed at left and right sides of the housing 4 of the portable part 2 to be open up and down. As shown in FIG. 7B, an engaging protrusion is introduced and engaged from a lower side of the engagement groove 42*d*, so that the protective cover 16 is retained at the portable part 2. Moreover, for instance, a prominence and a depression engaged with each other, are formed at a lower portion of the engagement groove 42*d* and the engaging protrusion in order to prevent the protective cover 16 from being separated downwards. Because the engagement groove 42*d* is formed at the housing 4 of the portable part 2, as shown in FIG. 7A, although the portable part 2 is separated from the fixed part 1, the protective cover 16 can be installed. If the aforementioned arrangement is used, the push button 72 is protected, an erroneous operation of the push button 72 is prevented, and a profile may be improved. Also, the protective cover 16 covers the window member 10, thereby preventing the window member 10 from being contaminated.

Figure 8:
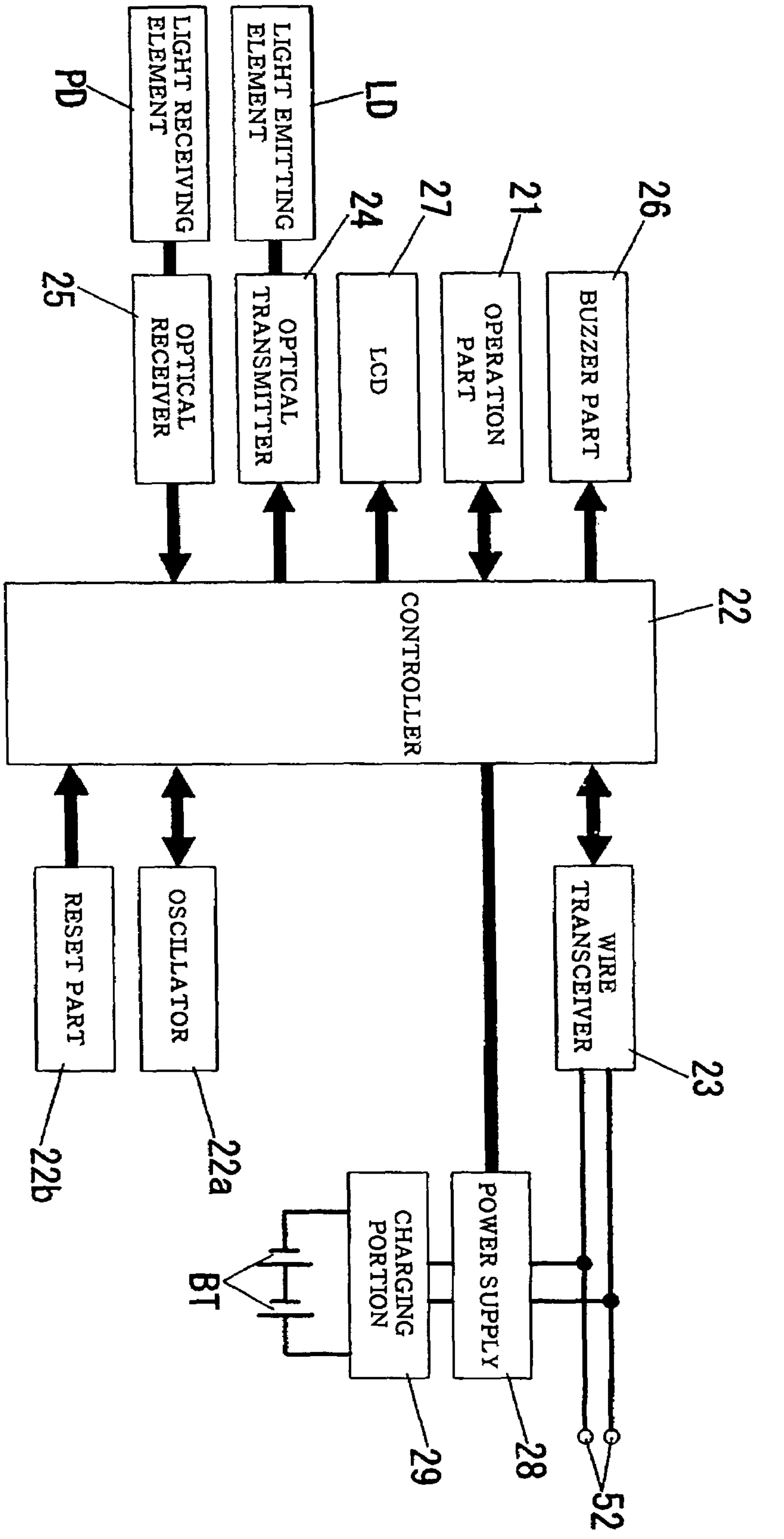
FIG. 8 is a block diagram showing a constitution of a portable part of the above, in accordance with another example.

In addition, a second battery may be used as a battery BT. As shown in FIG. 8, a charging portion 29 may be installed. The charging portion 29 receives a power through the signal line L when the portable part 2 is retained at the fixed part 1, and charges the battery BT using the received power. When the foregoing structure is adopted, the case of discharging the battery BT is reduced.

Figure 9:
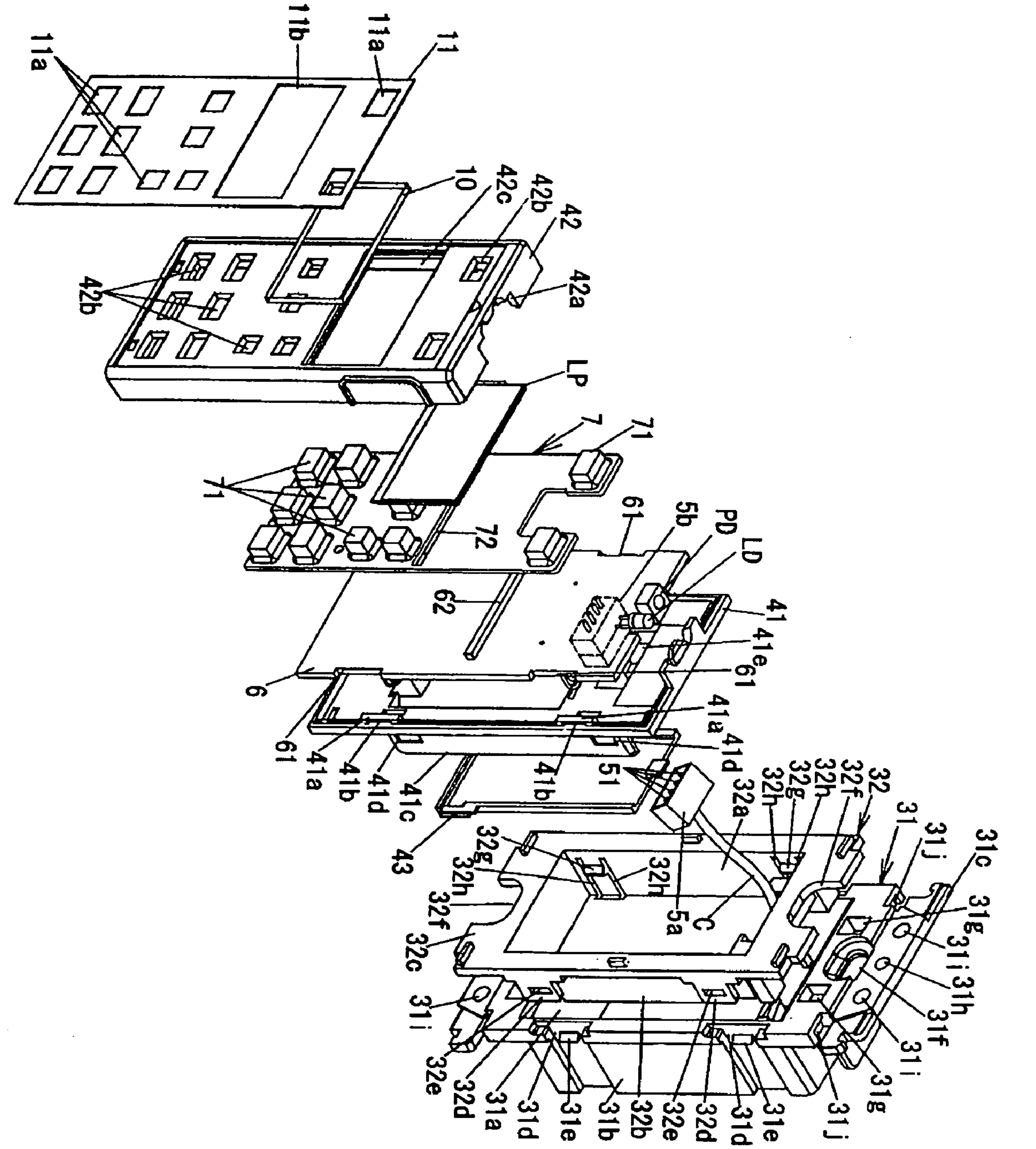
FIG. 9 is an exploded perspective view of the above in accordance with another embodiment of the present invention.

As shown in FIG. 9, the connector 5*a* of the fixed part 1 may be mechanically and electrically connected to the body 32 through an electric wire having flexibility. If this construction is used, since an installation of the portable part 2 and connections of the connector 5*a* and 5*b* at the fixed part 1 can be performed separately, the connectors 5*a* and 5*b* are difficult to be broken upon installing the portable part 2 at the fixed part 1.

Figure 10:
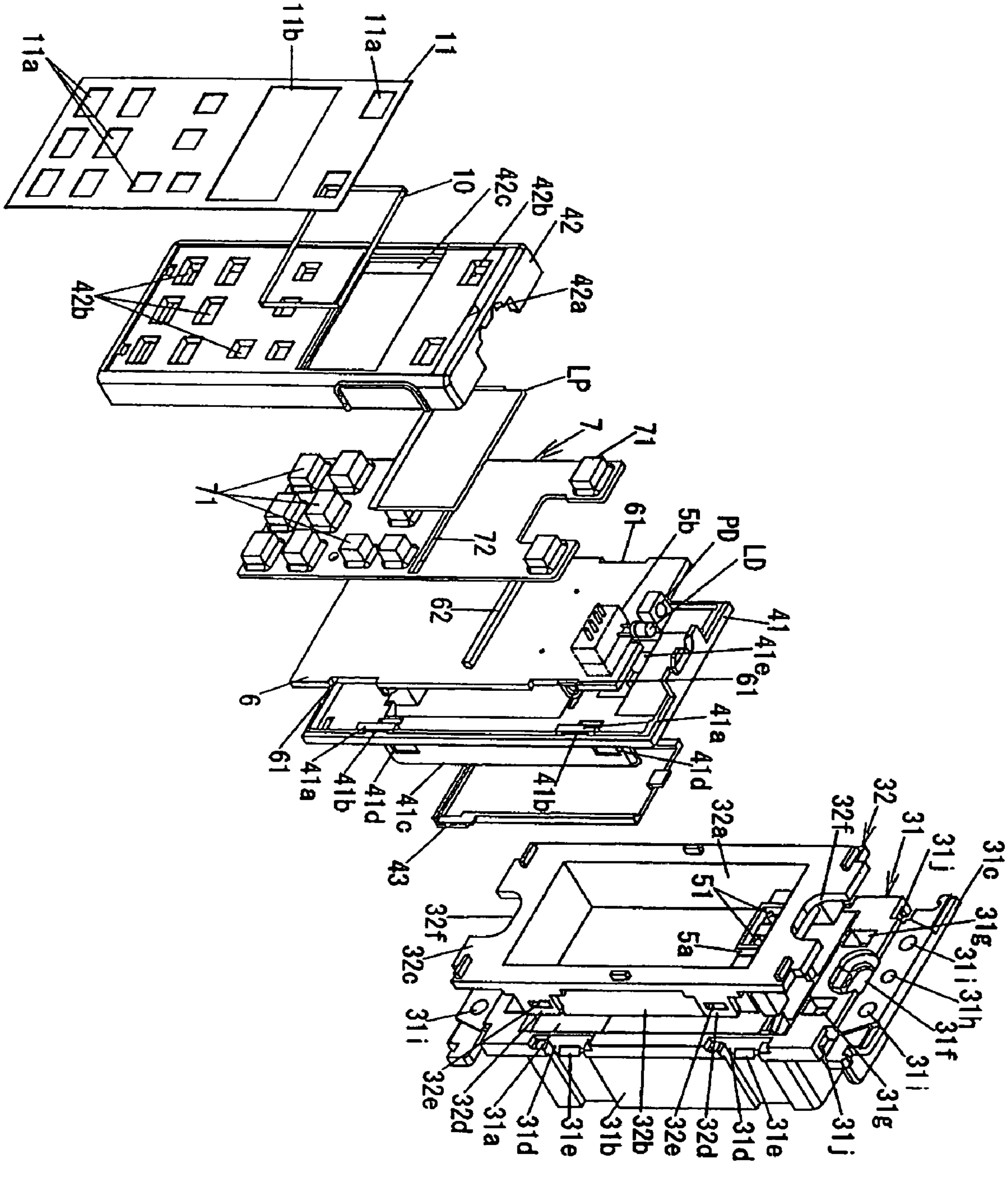
FIG. 10 is an exploded perspective view of the above in accordance with further embodiment of the present invention.

As shown in FIG. 10, a magnetic connector is used as each of the connectors 5*a* and 5*b*. The magnetic connector has a coupling force produced by a magnetic force between a permanent magnet (not shown) installed at one side thereof and an adsorption plate installed at another side thereof. When fixing the portable part 2 to the fixed part 1 by the coupling force of the connectors 5*a* and 5*b*, since the portable part 2 is separated from the fixed part 1 against the magnetic force, the contactors 51 and 52 are difficult to be broken.

Figure 11:
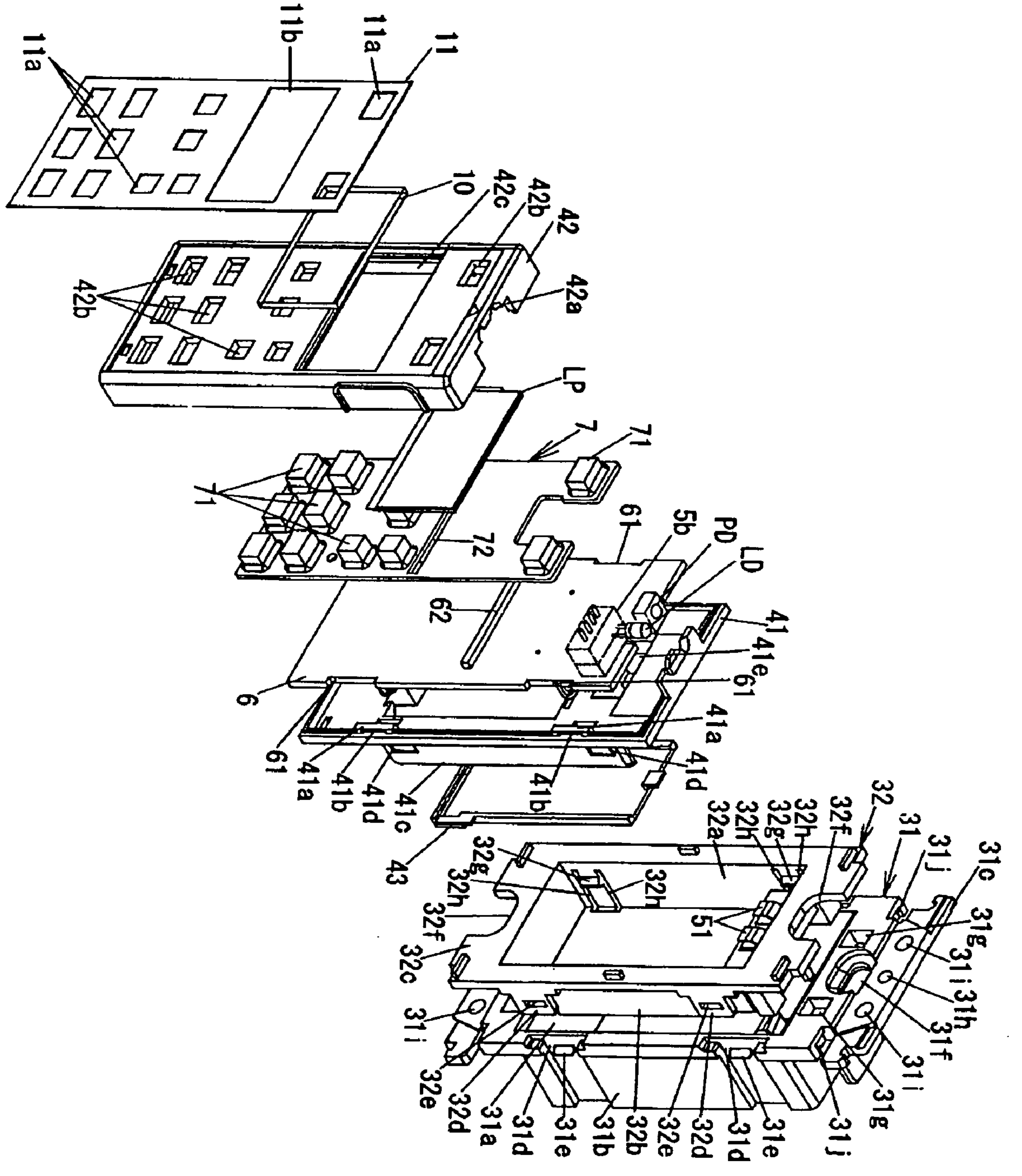
FIG. 11 is an exploded perspective view of the above in accordance with still further another embodiment of the present invention.

As shown in FIG. 11, in place of installing the connector 5*a* at the fixed part 1, only a contactor 51 may be installed. The contactor 51 is composed of a plate spring having elasticity in a front and rear direction. The contactor 51 is in contact with a contactor 52 of the connector 5*b* when the portable part 2 is retained at the fixed part 1, and conducts. A surface nearly perpendicular to an engaging direction between the portable part 2 and the fixed part 1, namely, a front and rear direction may be used as a contacting surface of a contactor 52 of the portable part 2 and a contactor 51 of the fixed part 1. If the construction is adopted, when the portable part 2 is attached to and separated from the fixed part 1, although the portable part 2 is shaken against the fixed part 1, because contacting surfaces are just rubbed against each other, the contactors 51 and 52 are not broken. Further, the contactor 51 has elasticity in an engaging direction of the portable part 2 and the fixed part 1, that is, a front and rear direction. Accordingly, although the contactor 51 is worn away, a contacting pressure is difficult to be reduced.

As is clear from the foregoing description, in accordance with the present invention, it is possible to set both an address corresponding to a switch of an operation terminal or to a load of a control terminal and relational data of a transmission controller by including in a portable part an operation means for allowing the addresses and the relational data to be input manually, a control means for generating the addresses and the relational data based on the input to the operation means, a wireless transmission means controlled by the control means for transmitting the addresses to the operation terminal and the control terminal as wireless signals, a connected means for being electrically connected to a signal line through a connecting means of the fixed part while the portable part is retained on the fixed part, a wire transmission means controlled by the control means for transmitting the relational data to the transmission controller through the connected means, the connecting means and the signal lines. Further, by including the fixed part, which is fixed on installation surface, for detachably retaining the portable part, it is possible for the portable part to be retained on the fixed part in case that address setting is not performed. Accordingly, although a dedicated storage receptacle is not provided additionally, the portable part will not be easily lost.

The present disclosure relates to subject matter contained in Japanese Application No. 2004-219334, filed on Jul. 27, 2004, the contents of which are herein expressly incorporated by reference in its entirety.

What is claimed is:

1. A setting apparatus for remote monitoring and control system, which is used for a remote monitoring and control system including an operation terminal having switches to which unique addresses are respectively set, a control terminal connected to loads to which unique addresses are respectively set, and a transmission controller which causes transmission signals to be communicated between the operation terminal and the control terminal, in a time division multiplex transmission mode, through a signal line to which the operation terminal and the control terminal are branch-connected, generates control data for controlling the loads based on monitoring data received from the operation terminal when the switches are operated, and transmits the control data to the control terminal to which the related loads are connected by relational data preset for the operated switches, and which is connected to the signal line, and generates, transmits and sets the relational data to the transmission controller so as for a plurality of loads to be controlled simultaneously by one switch are provided, the setting apparatus comprising:

a fixed part fixed to a installation surface; and a portable part detachably attached to the fixed part and capable of being carried as separated from the fixed part, wherein the fixed part includes a base fixed to the installation surface and a first connector for electrically connecting the portable part to the signal line, and wherein the portable part includes an operator for allowing the addresses and the relational data to be input manually, a controller for generating the addresses and the relational data based on the input to the operator, a wireless transmission means controlled by the controller for transmitting the addresses to the operation terminal and the control terminal as wireless signals, a second connector for being electrically connected to the signal line through the first connector of the fixed part while the portable part is retained on the fixed part, a wired transmitter controlled by the controller for transmitting the relational data to the transmission controller through the second connnector, the first connector and the signal lines, a power supply for supplying power to each part of the portable part, and a housing detachably mounted on the base of the fixed part by a retainer installed on at least one of the fixed part and the portable part, for receiving the controller and the power supply and for exposing the operator to a position exposed while being mounted on the base of the fixed part.

2. The setting apparatus for remote monitoring and control system according to claim 1, wherein the first connector and the second connector are composed of connectors which are mechanically and electrically connected to each other, and a connector of the fixed part is mechanically connected to the base of the fixed part through a flexible electric wire and is electrically connected to the signal line.

3. The setting apparatus for remote monitoring and control system according to claim 2, wherein the base of the fixed part includes a recess part in which at least part of the housing of the portable part can be housed, and the first connector is received in the recess part and includes a blank cover detachably attached to the base of the fixed part for covering the recess part.

4. The setting apparatus for remote monitoring and control system according to claim 2, further comprising a protective cover detachably attached to the housing of the portable part for covering the operator.

5. The setting apparatus for remote monitoring and control system according to claim 2, wherein the power supply includes a secondary battery, and the portable part receives power through the first connector under being retained on the fixed part and includes a charger for charging the secondary battery.

6. The setting apparatus for remote monitoring and control system according to claim 1, wherein the retainer is composed of a magnet mounted on either side of the fixed part and the portable part and an adsorption plate, which comprises a magnetic material, and is adsorbed to the magnet while being mounted on the other side of the fixed part and the portable part, and each of the first connector and the second connector comprises a conductive material and comprise of contactors that contact and conduct with each other when the adsorption plate is magnetically attached to the magnet.

7. The setting apparatus for remote monitoring and control system according to claim 6, wherein the base of the fixed part includes a recess part in which at least part of the housing of the portable part can be housed, and the first connector is received in the recess part and includes a blank cover detachably attached to the base of the fixed part for covering the recess part.

8. The setting apparatus for remote monitoring and control system according to claim 6, further comprising a protective cover detachably attached to the housing of the portable part for covering the operator.

9. The setting apparatus for remote monitoring and control system according to claim 6, wherein the power supply includes a secondary battery, and the portable part receives power through the first connector under being retained on the fixed part and includes a charger for charging the secondary battery.

10. The setting apparatus for remote monitoring and control system according to claim 1, wherein the first connector is composed of contactors, which comprise conductive material, capable of contacting and conducting with each other when the portable part is retained on the fixed part, and a contacting surface between the contactors is a surface intersecting a direction in which the portable part is attached to the fixed part.

11. The setting apparatus for remote monitoring and control system according to claim 10, wherein the base of the fixed part includes a recess part in which at least part of the housing of the portable part can be housed, and the first connector is received in the recess part and includes a blank cover detachably attached to the base of the fixed part for covering the recess part.

12. The setting apparatus for remote monitoring and control system according to claim 10, further comprising a protective cover detachably attached to the housing of the portable part for covering the operator.

13. The setting apparatus for remote monitoring and control system according to claim 10, wherein the power supply includes a secondary battery, and the portable part receives power through the first connector under being retained on the fixed part and includes a charger for charging the secondary battery.

14. The setting apparatus for remote monitoring and control system according to claim 1, wherein the base of the fixed part includes a recess part in which at least part of the housing of the portable part can be housed, and the first connector is received in the recess part and includes a blank cover detachably attached to the base of the fixed part for covering the recess part.

15. The setting apparatus for remote monitoring and control system according to claim 14, further comprising a protective cover detachably attached to the housing of the portable part for covering the operator.

16. The setting apparatus for remote monitoring and control system according to claim 14, wherein the power supply includes a secondary battery, and the portable part receives power through the first connector under being retained on the fixed part and includes a charger for charging the secondary battery.

17. The setting apparatus for remote monitoring and control system according to claim 1, further comprising a protective cover detachably attached to the housing of the portable part for covering the operator.

18. The setting apparatus for remote monitoring and control system according to claim 17, wherein the power supply includes a secondary battery, and the portable part receives power through the first connector under being retained on the fixed part and includes a charger for charging the secondary battery.

19. The setting apparatus for remote monitoring and control system according to claim 1, wherein the power supply includes a secondary battery, and the portable part receives power through the connector under being retained on the fixed part and includes a charger for charging the secondary battery.

* * * * *

UNITED STATES PATENT AND TRADEMARK OFFICE

CERTIFICATE OF CORRECTION

PATENT NO. : 7,225,972 B2
APPLICATION NO. : 11/186881
DATED : June 5, 2007
INVENTOR(S) : M. Kawamata It is certified that error appears in the above-identified patent and that said Letters Patent is hereby corrected as shown below:

At column 13, line 28 (claim 6, line 9) of the printed patent, after "comprise" delete "of".

Signed and Sealed this

Thirteenth Day of May, 2008

JON W. DUDAS
*Director of the United States Patent and Trademark Office*